No. 654,103. Patented July 17, 1900.
C. O. F. SCHROTTKE.
ATTACHMENT FOR INSTRUMENTS OF PRECISION.
(Application filed May 15, 1899.)
(No Model.)
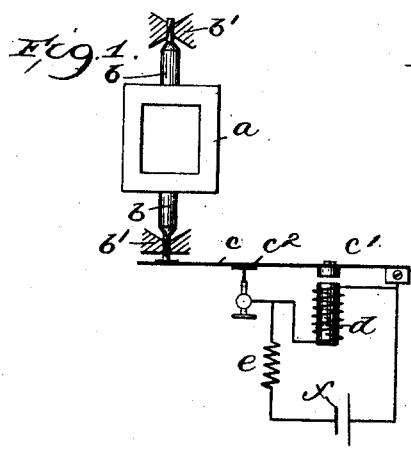
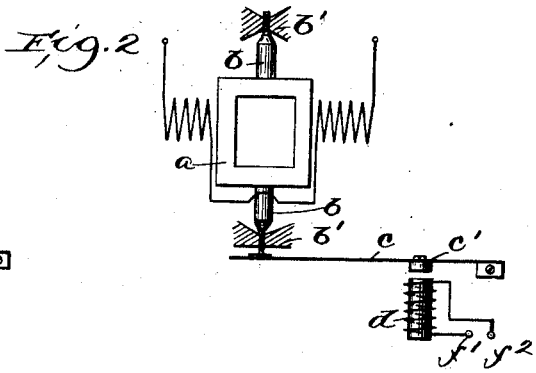
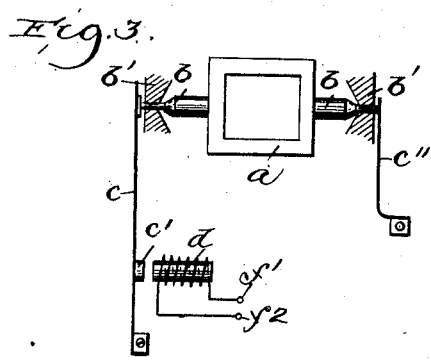
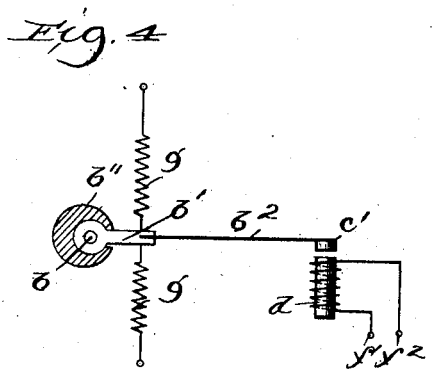
Witnesses:
K. White.
Harry B. C. White.
Inventor:
Carl Otto Franz Schrottke,
By Charles A. Brown & Cragg
Attorneys.
THE NORRIS PETERS CO., PHOTO-LITHO., WASHINGTON, D. C.

UNITED STATES PATENT OFFICE.

CARL OTTO FRANZ SCHROTTKE, OF BERLIN, GERMANY, ASSIGNOR TO THE SIEMENS & HALSKE ELECTRIC COMPANY OF AMERICA, OF CHICAGO, ILLINOIS.

ATTACHMENT FOR INSTRUMENTS OF PRECISION.

SPECIFICATION forming part of Letters Patent No. 654,103, dated July 17, 1900.

Application filed May 15, 1899. Serial No. 716,828. (No model.)

*To all whom it may concern:*

Be it known that I, CARL OTTO FRANZ SCHROTTKE, a subject of the Emperor of Germany, residing at Berlin, Germany, have invented a certain new and useful Improvement in Attachments for Instruments of Precision, (Case No. 188,) of which the following is a full, clear, concise, and exact description, reference being had to the accompanying drawings, forming a part of this specification.

My invention relates to means for increasing the sensitiveness of measuring instruments or other apparatus wherein the minimum of friction is necessary, and has for its object the provision of apparatus for securing increased accuracy and efficiency.

My invention is more particularly applicable to electrical measuring instruments, in connection with which I will describe the same. It is well known that in such instruments provided with oscillating or rotating parts it is necessary to make their movement as independent as possible of mechanical friction. Only when this condition is complied with are accurate measurements obtainable. Furthermore, it is known that in such instruments the movable needle or part is somewhat slow or reluctant in starting upon a change in the condition of the measured circuit, the so-called "friction of rest" being greater than that of movement, a gradual transition between these taking place, which makes itself perceptible only in case of very low speeds. For this reason the friction is a disturbing influence, inasmuch as the armature and indicating part are actuated only after a material change in the attracting or actuating force within the instrument. It is therefore a common expedient in electrical practice to impart to the instrument a slight vibration by tapping it with the fingers.

My invention is designed to overcome the difficulty alluded to; and it consists in providing, in connection with the oscillating or moving part, electromagnetic or other apparatus for imparting thereto the necessary vibration, which almost entirely obviates the effect of the force named and causes the part to start from a state of rest with the slightest change in the actuating force.

My invention will be more readily understood by reference to the accompanying drawings, diagrammatically illustrating apparatus embodying my invention, wherein—

Figure 1 illustrates electromagnetic means actuated by a direct current. Fig. 2 illustrates an adaptation for use in connection with alternating current. Fig. 3 shows the application of my improvement to a horizontal shaft, and Fig. 4 illustrates a modification of the apparatus for practicing my invention.

The same letter of reference is used to designate like parts in each of the several figures.

Referring to Fig. 1, the armature $a$ is mounted upon a vertical shaft $b$, carried in end bearings $b'$. The lower end of the shaft $b$ rests upon and is supported by the end of a long spring $c$. Upon the said spring, which is secured at its other end, is mounted an armature $c'$, which is adapted to be actuated by an electromagnet $d$, connected in circuit with a resistance $e$ and battery $f$. A make-and-break device $c^2$ is provided upon the spring, which is adapted to short-circuit the current about the electromagnet, thereby throwing the spring and the supported armature and shaft into vibration. It will be understood that any suitable indicating appliance or needle may be mounted upon the shaft $b$ to be actuated by the movement of the armature.

In Fig. 2 the battery, resistance, and make-and-break apparatus are omitted, the instrument shown being intended for use in connection with an alternating current, which circuit, it will be understood, is connected with the electromagnet by binding-posts $f'\,f^2$. The instrument shown in Fig. 3 is similar to that last described, with the exception that an opposing spring $c''$ is mounted at the opposite end of the shaft $b$, which is carried in horizontal bearings $b'$. This spring is partially or entirely replaced in instruments having their armatures mounted upon vertical shafts, as shown in Figs. 1 and 2, by the force of gravity, but may be employed in such instruments as occasion requires. Where alternating current is available, it is obvious that no interrupting device is required, since the armature $c'$ and its connected spring are thrown into rapid vibration by alternations of the current. When polyphase current is employed, the magnetism in armature $c'$ will exhibit a periodical retardation as against that of electromagnet $d$, so that when the electromagnet has changed in polarity the armature will still remain of the same polarity, thus causing a powerful repulsion after an equally-powerful attraction of the armature. The oscillations or vibrations imparted by the electromagnet and armature to the spring are in turn imparted to the shaft $b$, which is thereby given a slight longitudinal movement within its bearings. Experience has shown that this serves almost entirely to overcome the so-called "friction of rest," and the sensitiveness of the instrument is extraordinarily augmented.

The apparatus shown in Fig. 4 is a modification of that hitherto considered, which consists in rotatably mounting the lower end bearing $b'$ within a supporting block or part $b''$. Connected with the said bearing is an extended arm $b^2$, carrying the armature $c'$ at its farther end. The movement of bearing part $b'$ is retarded by opposing springs $g\ g$. It will be seen that upon successive alternations in the attractive force of the electromagnet $d$ a slight oscillating movement will be imparted to the bearing $b'$, which, having slight play in its supporting part $b''$, will be rapidly twisted back and forth beneath the shaft $b$. This apparatus also accomplishes the same result and causes the armature and indicating apparatus to start from a state of rest under very slight variations in the actuating-current. It will be appreciated by those skilled in the art that other apparatus for accomplishing this result than that herein specifically named may be constructed without departing from the spirit of my invention. Moreover, it is obvious that my said invention is applicable to other apparatus than electrical measuring instruments, in connection with which I have chosen to set forth my said invention.

Having now described means for practicing this invention, I claim as new, and desire to secure by these Letters Patent, together with all modifications which may be made by mere skill, the following:

1. In apparatus of the class described the combination, with a shaft carrying an oscillating or rotating part, of bearings between which said shaft is mounted to have a slight end play therein, and means for causing the longitudinal vibratory movement of the shaft whereby the sensitiveness of the instrument is increased, substantially as described.

2. In an electrical measuring instrument, the combination with a shaft carrying a rotating or oscillating part, of a supporting end bearing therefor wherein the same is movable, and means for causing the relative movement of the shaft and bearing other than the usual rotation of said shaft within its bearing whereby the sensitiveness of the instrument is increased, substantially as described.

3. In an apparatus of the class described, the combination with a shaft whereon is mounted a rotating, or oscillating part, of bearings between which said shaft is rotatably mounted to have a slight end play, an electromagnet, a spring or part $c$ actuated by the electromagnet, and engaging the said shaft, and means for causing variation of the attractive force of said electromagnet whereby longitudinal movement is imparted to the shaft, substantially as described.

4. In apparatus of the class described, the combination with a shaft $b$ of a spring or part $c$ engaging and partially supporting the end of said shaft, an electromagnet $d$, a coacting armature $c'$ connected with part $c$ and means for causing variation in the attractive force of said electromagnet whereby longitudinal movement is imparted to shaft $b$, substantially as described.

5. In an electrical measuring instrument, the combination with a shaft $b$ carrying the rotatable armature, of a bearing $b'$ wherein the said shaft is mounted, an electromagnet, and a vibrating spring or part actuated by said electromagnet and supporting the said shaft, adapted to cause a slight continuous relative movement of the shaft and bearing, whereby the sensitiveness of the instrument is increased, substantially as described.

In witness whereof I hereunto subscribe my name this 22d day of April, A. D. 1899.

CARL OTTO FRANZ SCHROTTKE.

Witnesses:
WOLDEMAR HAUPT,
HENRY HASPER.